(12) United States Patent
Hill

(10) Patent No.: US 11,493,076 B2
(45) Date of Patent: *Nov. 8, 2022

(54) MOUNTING HARDWARE

(71) Applicant: THE HILLMAN GROUP, INC., Cincinnati, OH (US)

(72) Inventor: Ian A. Hill, Plano, TX (US)

(73) Assignee: THE HILLMAN GROUP, INC., Cincinnati, OH (US)

( * ) Notice: Subject to any disclaimer, the term of this patent is extended or adjusted under 35 U.S.C. 154(b) by 201 days.

This patent is subject to a terminal disclaimer.

(21) Appl. No.: 16/722,428

(22) Filed: Dec. 20, 2019

(65) Prior Publication Data

US 2020/0124080 A1 Apr. 23, 2020

Related U.S. Application Data

(60) Continuation of application No. 15/933,959, filed on Mar. 23, 2018, now Pat. No. 10,520,007, which is a (Continued)

(51) Int. Cl.
*F16B 37/14* (2006.01)
*F16B 35/00* (2006.01)

(52) U.S. Cl.
CPC .............. *F16B 37/14* (2013.01); *F16B 35/00* (2013.01)

(58) Field of Classification Search
CPC ...................................................... F16B 37/14
(Continued)

(56) References Cited

U.S. PATENT DOCUMENTS

| 111,996 A | 2/1871 | Washbourne |
| 153,500 A | 7/1874 | Seymour |

(Continued)

FOREIGN PATENT DOCUMENTS

| CN | 200985943 | 12/2007 |
| CN | 201382063 | 1/2010 |

(Continued)

OTHER PUBLICATIONS

Curriculum Vitae of Fred Peterson Smith, presented in Support of Petition for Inter Partes Review of U.S. Pat. No. 9,957,998, *Simpson Strong-Tie Company Inc.* v. *Oz-Post International, LLC*, 4 pages.

(Continued)

*Primary Examiner* — Flemming Saether
(74) *Attorney, Agent, or Firm* — Thompson Hine LLP

(57) ABSTRACT

A hardware component imitating a nut/bolt/washer connection for structural members includes a base portion with a disc-shaped base plate and a cylindrical member including an outer surface in the shape of a hex nut. The disc-shaped base plate extends radially to the cylindrical member and imitates a washer. The disc-shaped base plate includes a first opening having a first diameter and the cylindrical member includes a second opening having a second diameter, where the first and second openings are concentric and said second diameter is larger diameter than said first diameter. The first opening is sized to receive therethrough a shaft of a mounting device, and the second opening is sized to receive therein a head of said mounting device.

8 Claims, 7 Drawing Sheets

Related U.S. Application Data continuation of application No. 15/338,104, filed on Oct. 28, 2016, now Pat. No. 9,957,998, which is a continuation of application No. 14/820,757, filed on Aug. 7, 2015, now Pat. No. 9,771,966, which is a division of application No. 13/918,227, filed on Jun. 14, 2013, now Pat. No. 9,133,874.

(60) Provisional application No. 61/660,419, filed on Jun. 15, 2012.

(58) Field of Classification Search
USPC .......................................... 411/372.5–377
See application file for complete search history.

(56) References Cited

U.S. PATENT DOCUMENTS

| | | |
|---|---|---|
| 236,723 A | 1/1881 | Sellers |
| 529,683 A | 11/1894 | Herman |
| D30,898 S | 5/1899 | Paine |
| 933,865 A | 9/1909 | Umholtz |
| 964,827 A | 7/1910 | Whitmore |
| 974,637 A | 11/1910 | Borup |
| 1,086,737 A | 2/1914 | Taylor |
| 1,162,467 A | 11/1915 | Fitz |
| 1,368,222 A | 2/1921 | Foreman |
| 1,374,963 A | 4/1921 | Stevenson |
| 1,400,531 A | 12/1921 | Dodds |
| 1,401,684 A | 12/1921 | Rogers et al. |
| 1,480,253 A | 5/1923 | Fisher |
| 1,506,005 A | 8/1924 | Kraft |
| 1,507,840 A | 9/1924 | Landgraf |
| 1,703,232 A | 2/1929 | Gray et al. |
| 1,908,080 A | 5/1933 | Thompson |
| 1,994,978 A | 3/1935 | Brown |
| 2,278,320 A | 5/1941 | Kath |
| 2,316,695 A | 4/1943 | Jaffa |
| 2,816,473 A | 12/1957 | Labee |
| 3,042,068 A | 7/1962 | Smith |
| 3,174,383 A | 3/1965 | Friedrich |
| 3,191,486 A * | 6/1965 | Gibbens ............. B25B 23/1415 411/4 |
| 3,204,586 A | 9/1965 | Marsh, Jr. |
| 3,266,828 A | 8/1966 | Baier |
| 3,269,228 A | 8/1966 | Mack |
| 3,492,841 A | 2/1970 | Ipri |
| 3,561,820 A * | 2/1971 | Chaivre ............... F16B 37/14 411/430 |
| 3,585,900 A * | 6/1971 | Chaivre ............... F16B 37/14 411/430 |
| D233,138 S | 10/1974 | Vogel |
| 3,851,978 A | 12/1974 | Kuipers |
| 3,965,793 A | 6/1976 | Roser |
| 4,092,896 A | 6/1978 | Puchy |
| 4,111,568 A | 9/1978 | Wing |
| 4,125,140 A | 11/1978 | Basile |
| 4,134,438 A | 1/1979 | Frieberg et al. |
| 4,207,938 A | 6/1980 | Mortus |
| D256,553 S | 8/1980 | Fayle |
| 4,261,666 A * | 4/1981 | Katayama ............. B25B 9/02 403/235 |
| 4,274,754 A | 6/1981 | Cohen |
| 4,281,699 A | 8/1981 | Grube |
| 4,347,020 A * | 8/1982 | White ............... E21D 21/0086 405/259.5 |
| 4,436,005 A | 3/1984 | Hanson |
| D276,879 S | 12/1984 | Bell |
| 4,540,322 A | 9/1985 | Coffia |
| 4,577,450 A * | 3/1986 | Large ................ B64C 1/18 411/369 |
| 4,601,624 A | 7/1986 | Hill |
| 4,621,230 A | 11/1986 | Crouch et al. |
| 4,631,887 A | 12/1986 | Francovitch |
| 4,632,616 A | 12/1986 | Sidoti |
| 4,683,670 A | 8/1987 | Bates |
| 4,708,555 A | 11/1987 | Terry |
| 4,822,223 A | 4/1989 | Williams |
| 4,867,624 A | 9/1989 | Walley |
| 4,887,951 A | 12/1989 | Hashimoto |
| D311,131 S | 10/1990 | Saito |
| 4,998,780 A | 3/1991 | Eshler et al. |
| 5,030,052 A | 7/1991 | Anderson et al. |
| 5,175,665 A | 12/1992 | Pegg |
| 5,302,069 A | 4/1994 | Toth et al. |
| 5,443,582 A | 8/1995 | Ching |
| 5,518,351 A * | 5/1996 | Peil ..................... F16B 35/06 248/59 |
| 5,626,449 A | 5/1997 | Mckinlay |
| 5,651,651 A | 7/1997 | Spencer |
| 5,697,746 A | 12/1997 | Brown et al. |
| 5,728,136 A | 3/1998 | Thal |
| 5,782,078 A | 7/1998 | Brantley |
| 5,904,383 A | 5/1999 | Van Der Wal |
| 5,927,921 A | 7/1999 | Hukari |
| D416,192 S | 11/1999 | Tu |
| 6,039,140 A | 3/2000 | Painter |
| 6,045,312 A | 4/2000 | Hsing |
| 6,053,683 A | 4/2000 | Cabiran |
| 6,220,804 B1 | 4/2001 | Pamer et al. |
| 6,309,158 B1 | 10/2001 | Bellinghausen et al. |
| D452,429 S | 12/2001 | Shinjo et al. |
| 6,332,741 B1 | 12/2001 | Janusz |
| 6,361,258 B1 | 3/2002 | Heesch |
| 6,387,129 B2 | 5/2002 | Rieser et al. |
| D459,207 S | 6/2002 | Miyata |
| 6,457,923 B1 | 10/2002 | Grossman |
| 6,478,518 B1 | 11/2002 | Hwang |
| 6,540,750 B2 | 4/2003 | Burkhart |
| 6,764,114 B1 | 7/2004 | Guillon |
| D512,886 S | 12/2005 | Christensen |
| D524,149 S | 7/2006 | Kim |
| D551,972 S | 10/2007 | Jacobs |
| D552,977 S | 10/2007 | He et al. |
| D567,074 S | 4/2008 | Gallien |
| 7,384,225 B2 | 6/2008 | Woolstencroft |
| D581,778 S | 12/2008 | Lesesky |
| D588,893 S | 3/2009 | Radich |
| 7,588,386 B2 | 9/2009 | Kielczewski et al. |
| D602,349 S | 10/2009 | Andersson |
| D609,999 S | 2/2010 | Andersson |
| 7,658,580 B1 | 2/2010 | Conway et al. |
| D613,594 S | 4/2010 | Huang |
| D613,595 S | 4/2010 | Huang |
| D614,247 S | 4/2010 | Clausen |
| 7,775,754 B2 * | 8/2010 | Calandra ............. F16B 37/14 411/5 |
| 7,981,143 B2 | 7/2011 | Doubler et al. |
| D643,279 S | 8/2011 | Crane et al. |
| D646,153 S | 10/2011 | Andersson |
| D646,154 S | 10/2011 | Andersson |
| 8,051,690 B2 | 11/2011 | Camisasca |
| D678,756 S | 3/2013 | Tsai |
| D679,988 S | 4/2013 | Yamazaki |
| 8,506,199 B2 | 8/2013 | Rump et al. |
| D691,033 S | 10/2013 | Allman |
| D698,234 S | 1/2014 | Bauer |
| 8,622,677 B2 | 1/2014 | Wu et al. |
| D698,637 S | 2/2014 | Su |
| D706,126 S | 6/2014 | Orow |
| D713,243 S | 9/2014 | Hsu |
| D720,785 S | 1/2015 | Sato |
| D721,423 S | 1/2015 | Jacques et al. |
| D725,461 S | 3/2015 | Kopp |
| 9,004,836 B2 | 4/2015 | Wells et al. |
| D733,546 S | 7/2015 | Balzhiser |
| 9,377,047 B2 | 6/2016 | Hill |
| D760,582 S | 7/2016 | Muzic |
| D788,574 S | 6/2017 | Baiz et al. |
| D798,701 S | 10/2017 | Hill |
| D803,040 S | 11/2017 | Schuit et al. |
| 9,957,998 B2 | 5/2018 | Hill |
| 2002/0197132 A1 | 12/2002 | Cruz et al. |
| 2004/0170487 A1 | 9/2004 | Thompson |

(56) References Cited

U.S. PATENT DOCUMENTS

| | | | |
|---|---|---|---|
| 2005/0053446 A1 | 3/2005 | Huang et al. | |
| 2008/0044254 A1* | 2/2008 | Wilson | F16B 37/14 411/429 |
| 2009/0108149 A1* | 4/2009 | Goto | B60N 3/103 248/205.1 |
| 2010/0172718 A1 | 7/2010 | Gong et al. | |
| 2010/0196119 A1 | 8/2010 | Miyagawa et al. | |
| 2011/0121152 A1 | 5/2011 | Ghatikar | |
| 2011/0170983 A1 | 7/2011 | Day et al. | |
| 2011/0214461 A1 | 9/2011 | Camisasca | |
| 2011/0226096 A1 | 9/2011 | Berton et al. | |
| 2013/0089388 A1 | 4/2013 | Liu et al. | |
| 2013/0136557 A1 | 5/2013 | Wang | |
| 2014/0023457 A1 | 1/2014 | Gaudron et al. | |
| 2014/0178150 A1 | 6/2014 | Su et al. | |
| 2014/0341649 A1 | 11/2014 | Bryan et al. | |
| 2015/0071731 A1 | 3/2015 | Scheerer | |
| 2015/0093213 A1 | 4/2015 | Scheerer | |
| 2016/0238054 A1 | 8/2016 | Lehtola | |
| 2016/0273573 A1 | 9/2016 | Hill | |
| 2017/0108026 A1 | 4/2017 | Yang | |
| 2017/0138386 A1 | 5/2017 | Hsu | |
| 2017/0282236 A1 | 10/2017 | Hutter, III | |
| 2017/0284447 A1 | 10/2017 | Falkenstein et al. | |

FOREIGN PATENT DOCUMENTS

| | | |
|---|---|---|
| KR | 200169430 | 11/1999 |
| KR | 200183592 | 3/2000 |
| WO | WO-92/07198 | 4/1992 |

OTHER PUBLICATIONS

Declaration of Fred P. Smith, P.E. in Support of Petition for Inter Partes Review of U.S. Pat. No. 9,957,998, *Simpson Strong-Tie Company Inc.* v. *Oz-Post International, LLC*, Jul. 20, 2018, 125 pages.

English machine translation of previously cited Chinese Publication No. 21382063; translation provided to Applicant Jun. 19, 2019; 9 pages.

English translation and certificate of translation of previously cited Chinese Publication No. 200985943; translation provided to Applicant Jun. 19, 2019; 14 pages.

Expert Report of Fred P. Smith, *Simpson Strong-Tie Company Inc.* v. *Oz-Post International, LLC*, Case No. 3:18-cv-01188-WHO, Jun. 19, 2019, 99 pages.

Fournier, Ron et al., "HPBooks: Metal Fabricator's Handbook", The Berkley Publishing Group, p. 15.

U.S. Appl. No. 15/338,104, filed Oct. 28, 2016, 122 pages.

Petition for Inter Partes Review of U.S. Pat. No. 9,957,998, *Simpson Strong-Tie Company Inc.* v. *Oz-Post International, LLC*, Jul. 23, 2018, 84 pages.

Petitioner Power of Attorney for Inter Partes Review of U.S. Pat. No. 9,957,998, *Simpson Strong-Tie Company Inc.* v. *Oz-Post International, LLC*, 2 pages.

Precision Metalforming Association, Design Guidelines for Precision Metalforming: Metal Stamping, Fabrication, Metal Spinning, Roll Forming, Secondary Operations and Related Subjects, "Spot Welding", Fourth Edition, 2009, pp. 115-122.

Simpson Strong-Tie Company, Inc.'s Invalidity Contentions Pursuant to Patent Local Rule 3-3, *Simpson Strong-Tie Company Inc.* v. *Oz-Post International, LLC*, Docket No. 3:18-cv-01188, Mar. 23, 2018, 458 pages.

Steel 2 Wood Fence Bracket WAP OZ, video post date: Jun. 17, 2014 (online), https://www.homedepot.com/p/Oz-Post-Steel-2-Wood-Fence-Bracket-WAP-OZ-50110/204675163.

Webster's Third New International Dictionary, Merriam-Webster Inc., 1993, p. 864.

* cited by examiner

MOUNTING HARDWARE

PRIORITY CLAIM

This application is a continuation application of U.S. patent application Ser. No. 15/933,959 filed on Mar. 23, 2018, pending, which is a continuation of U.S. patent application Ser. No. 15/338,104, filed on Oct. 28, 2016, now U.S. Pat. No. 9,957,998, which is a continuation application of U.S. patent application Ser. No. 14/820,757, filed Aug. 7, 2015, now U.S. Pat. No. 9,771,966, which is a divisional application of U.S. patent application Ser. No. 13/918,227 filed Jun. 14, 2013, now U.S. Pat. No. 9,133,874, which claims priority to U.S. Provisional Application for Patent No. 61/660,419 filed Jun. 15, 2012, each of which is incorporated herein by reference in their entireties.

CROSS-REFERENCE TO RELATED APPLICATIONS

This application is related to U.S. patent application Ser. No. 15/168,649, entitled "Through Bolted Connection Hardware," filed on Jun. 22, 2016, now pending, which is a continuation of U.S. patent application Ser. No. 14/304,519, filed on Jun. 13, 2014, now U.S. Pat. No. 9,377,047, which claims priority to U.S. Provisional Patent Application No. 61/835,281, filed on Jun. 14, 2013, each of which is hereby incorporated by reference.

BACKGROUND OF THE INVENTION

Technical Field of the Invention

The present invention relates generally to mounting hardware and in particular to mounting hardware which imitates architectural hardware.

Description of Related Art

Many construction projects have aesthetic designs which require the use of architectural hardware. The term "architectural hardware" refers to hardware having antique designs. If the project budget permits, actual antique hardware components can be used, or alternatively the antique hardware components can be recreated or reproduced from same materials with the same design as the antique original. These options can be quite expensive, and thus are beyond the reach of most projects. Additionally, working with such connectors can require special skills and equipment, thus placing use and installation of architectural hardware components beyond the reach of the conventional consumer (such as a home owner).

One example of a desired architectural hardware component is the rivet, nail or pin connector. Another example of a desired architectural hardware component is a nut/bolt/washer connector. These components are typically made of iron or steel and used in a number of connection applications. Consumers desiring an aesthetic design matching old world craftsmanship would like to have access to rivet, nail, pin and/or nut/bolt/washer connector hardware that looks historically accurate but is made for easy installation at a low cost.

There would accordingly be an advantage if connectors having an architectural hardware aesthetic could be provided in a form which would permit installation using tools and skills possessed by most homeowners. In this way, the homeowner could match old world designs without the expense of finding actual antique parts, or paying for antique restorations or reproductions.

It is further known in the art to provide an antique-looking hardware component in the form of an appropriately configured head portion, such as domed cap to simulate a rivet or pin head, with a mounting device fixedly attached to the head portion. For example, a threaded connector or screw, or a nail, may be welded to a bottom or inside surface of the head portion. These hardware components can be installed as accent pieces, but do not provide for a structural configuration and support.

What is needed is a rivet, nail, pin and/or nut/bolt/washer connector sized and shaped to match antique connector designs but produced at a low per connector cost and constructed to permit easy installation. It would further be advantageous if the connector could also support use as a structural attachment.

SUMMARY

In accordance with an embodiment, apparatus comprises: a base portion including a disc-shaped base plate and a cylindrical member with a first threaded surface; wherein the disc-shaped base plate includes a first opening and the cylindrical member includes a second opening, said first and second openings being concentric; and a cap portion including a second threaded surface; wherein said cap portion is attachable to said base portion through engagement of the first and second threaded surfaces.

In an embodiment, a hardware component imitating a rivet, nail or pin connector comprises: a cap portion including a domed outer surface and a base surface, said base surface including a first cylindrical aperture and a second cylindrical aperture concentric with the first cylindrical aperture; wherein the second cylindrical aperture has an inner threaded surface; a base portion including a disc-shaped base plate and a cylindrical member having an outer threaded surface; wherein the inner threaded surface is configured to mate with the outer threaded surface; wherein the first cylindrical aperture is sized and shaped to receive the disc-shaped base plate.

In an embodiment, a hardware component imitating a nut/bolt/washer connector comprises: a base portion including a disc-shaped base plate and a cylindrical member having a first end mounted to the base plate, a second end opposite the first end and an outer surface with a hex configuration, said cylindrical member further including an aperture formed in the second end having an inner threaded surface; a cap portion including a flat outer surface, a flat base surface and an outer threaded surface extending between the flat outer surface and flat base surface; wherein the inner threaded surface is configured to mate with the outer threaded surface.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 1:
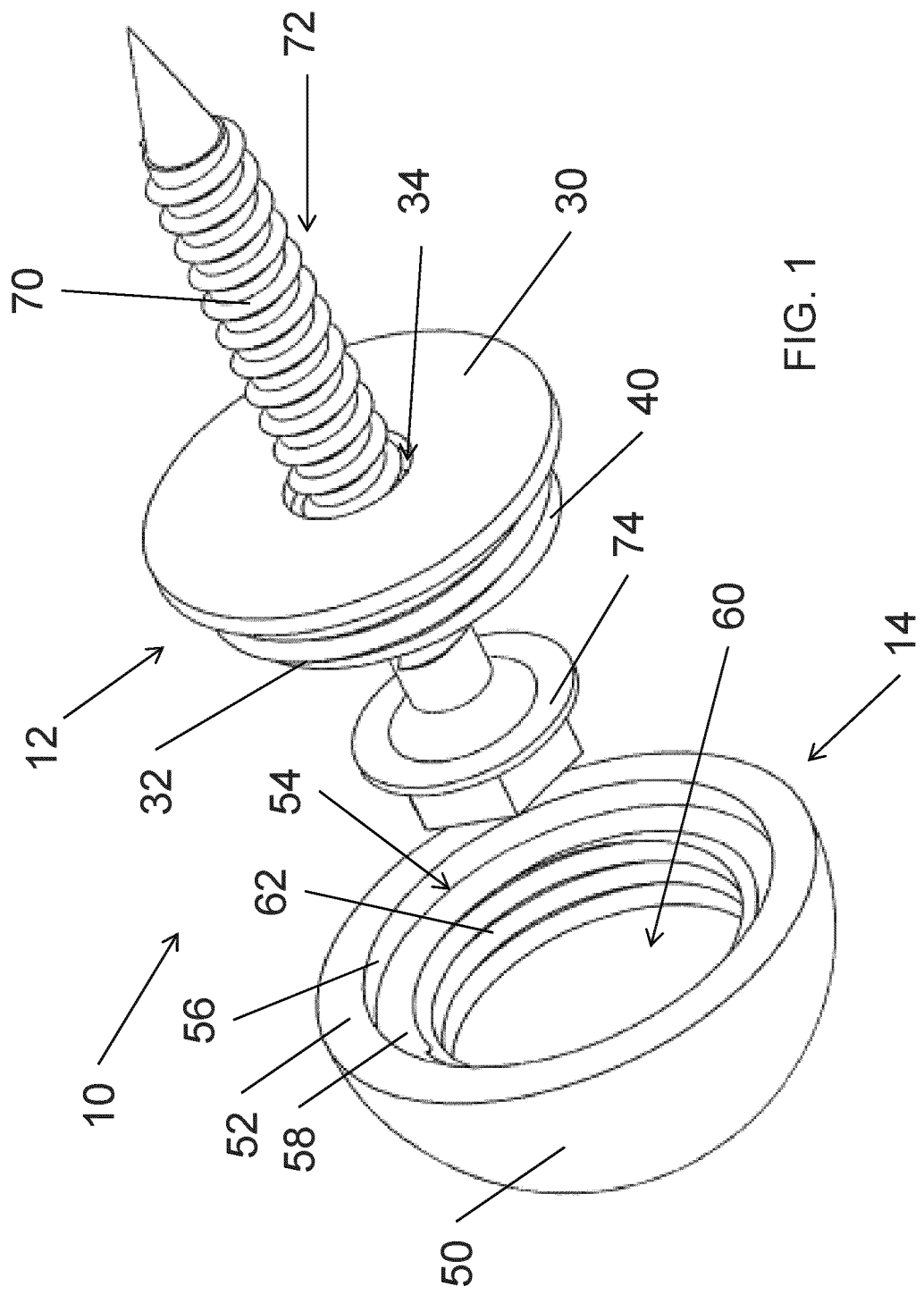
FIG. 1 is an exploded perspective view of a rivet, nail, pin connector.

Reference is now made to FIG. 1 which illustrates an exploded perspective view of a rivet, nail or pin connector 10. The connector 10 comprises a base portion 12 and a cap portion 14. An outer surface of the base portion 12 is threaded. An inner surface of the cap portion 14 is correspondingly threaded. Thus, the cap portion 14 may be attached to the base portion 12 through the threaded interconnection. In this configuration, the base portion 12 comprises a male body member of the assembly and the cap portion 14 comprises a female body member.

Figure 2:
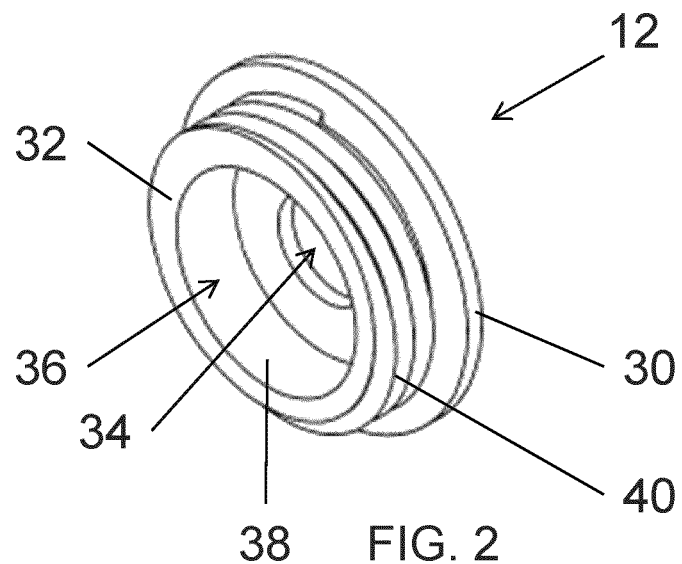
FIG. 2 is a perspective view of a base portion of the connector of FIG. 1.
Figure 3:
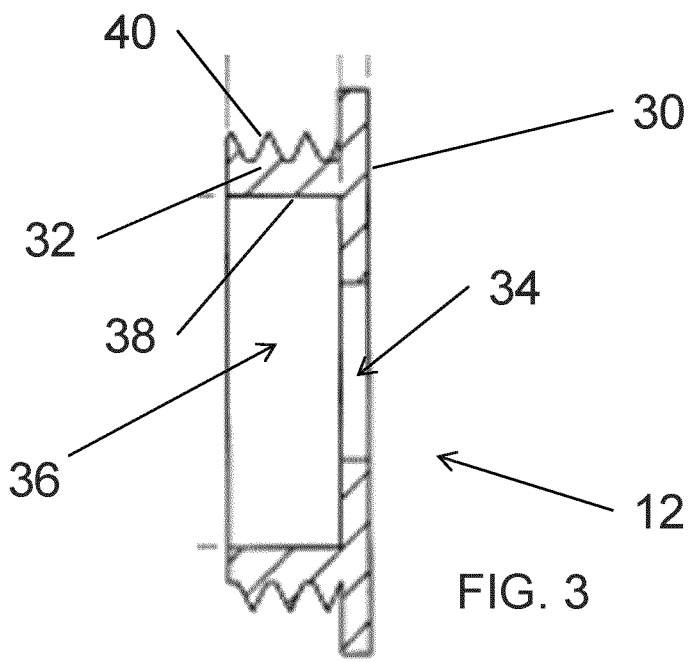
FIG. 3 is a cross-sectional view of the base portion of the connector of FIG. 1.

Reference is now additionally made to FIG. 2 which illustrates a perspective view of the base portion 12 and FIG. 3 which illustrates a cross-sectional view of the base portion 12. The base portion 12 comprises a disc-shaped base plate 30. A cylindrical member 32 is mounted to the base plate 30. The cylindrical member 32 is preferably centered on the base plate 30. The base plate 30 includes an opening 34 extending there through. The cylindrical member 32 includes an opening 36 coaxially aligned with the opening 34. The cylindrical member 32 accordingly has an inner sidewall 38 and an outer sidewall 40. The outer sidewall 40 is threaded. The inner sidewall 38 is smooth.

Figure 4:
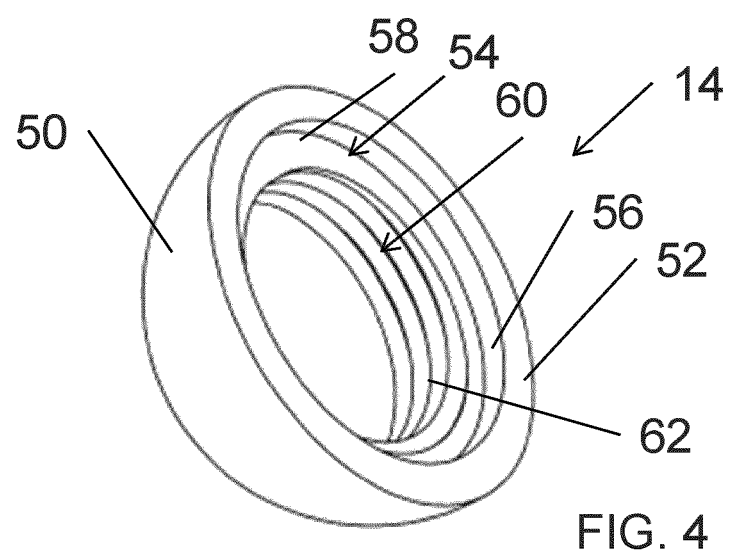
FIG. 4 is a perspective view of a cap portion of the connector of FIG. 1.
Figure 5:
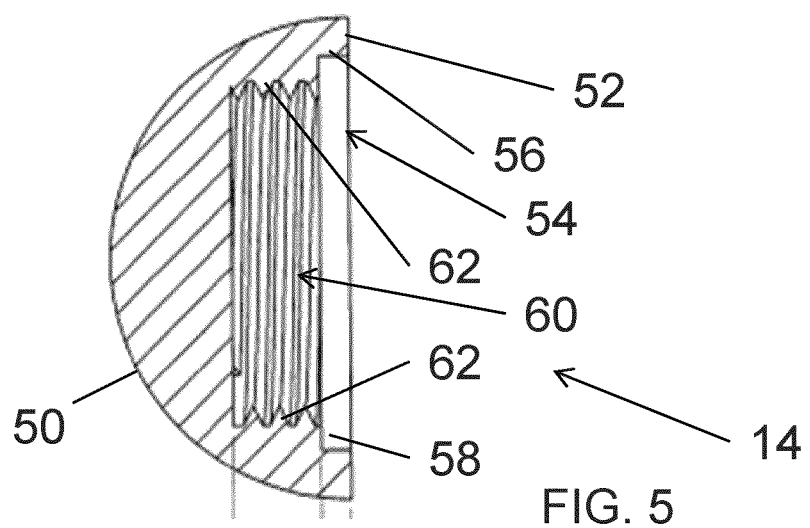
FIG. 5 is a cross-sectional view of the cap portion of the connector of FIG. 1.

Reference is now additionally made to FIG. 4 which illustrates a perspective view of the cap portion 14 and FIG. 5 which illustrates a cross-sectional view of the cap portion 14. The cap portion 14 has a domed outer surface 50 and a flat base surface 52. The domed outer surface 50 is sized and shaped to imitate the head of a rivet, nail or pin. The domed outer surface 50 may have a smooth finish. Alternatively, and perhaps preferably, the domed outer surface 50 may have a textured surface, for example with a texture that is dimpled to provide the look of a hammered or distressed surface. A first aperture 54 is formed in the base surface 52. The first aperture 54 is cylindrical and has a side wall 56. The aperture 54 is sized and shaped to receive the base plate 30 of the base portion 12 (i.e., its diameter is slightly larger than the diameter of the base plate 30 and its depth is about equal to a thickness of the base plate 30). A bottom of the first aperture 54 is defined by a ledge 58. A second aperture 60 is also formed, this time in the ledge 58, wherein the second aperture 60 is coaxial with the first aperture 54. The second aperture 60 is cylindrical and has a side wall 62. The sidewall 62 is threaded to matingly correspond with the threaded outer sidewall 40 of the base portion 12. The second aperture 60 has a depth equal to or, or more preferably exceeding a height of the cylindrical member 32.

Reference is once again made to FIG. 1. The opening 34 in the base plate 30 of the base portion 12 is sized to permit passage there through of a shaft 70 of a mounting device 72 (such as a screw or bolt). The opening 36 (FIGS. 2 and 3) in the cylindrical member 32 of the base portion 12 is sized to permit reception of a head portion 74 of the mounting device 72. Advantageously, the user is not limited in selection of the mounting device 72. No limit on mounting hardware length, size or grade exists. So, if used in an ornamental manner, the user may choose a lower length, size or grade mounting device 72. However, if used in a structural manner the user may instead select a higher length, size or grade mounting device 72. The connector 10 is accordingly useful over a wide range of uses from purely ornamental to fully structural (where such structural use is augmented by the ornamental features of the cap portion).

To install the connector 10, the base portion 12 is positioned on a mounting member at a desired mounting location. The mounting device 72 is driven into the mounting member through the opening 34 in the base plate 30 until the head portion 74 rests against the base plate 30. The cap portion 14 is then attached to the base portion 12 by engaging the threaded sidewall 62 of the cap portion 14 to threaded outer sidewall 40 of the base portion 12. The cap portion 14 is rotated to tighten the cap portion 14 into a secured position on the base portion 12 which hides the base plate 30 within the first aperture 54, leaving the cap portion 14 with its domed outer surface 50 exposed. The resulting assembly thus imitates an architectural hardware component of the rivet, nail or pin connector type. Advantageously, the installation solely requires the use of a conventional mounting device 72 (for example, screw or bolt) and thus does not require specific installation expertise or tools. The connector 10 may solely provide a decorative feature as installed. Alternatively, through proper selection of the mounting device 72, the connector 10 may additionally serve as a structural component.

Figure 6:
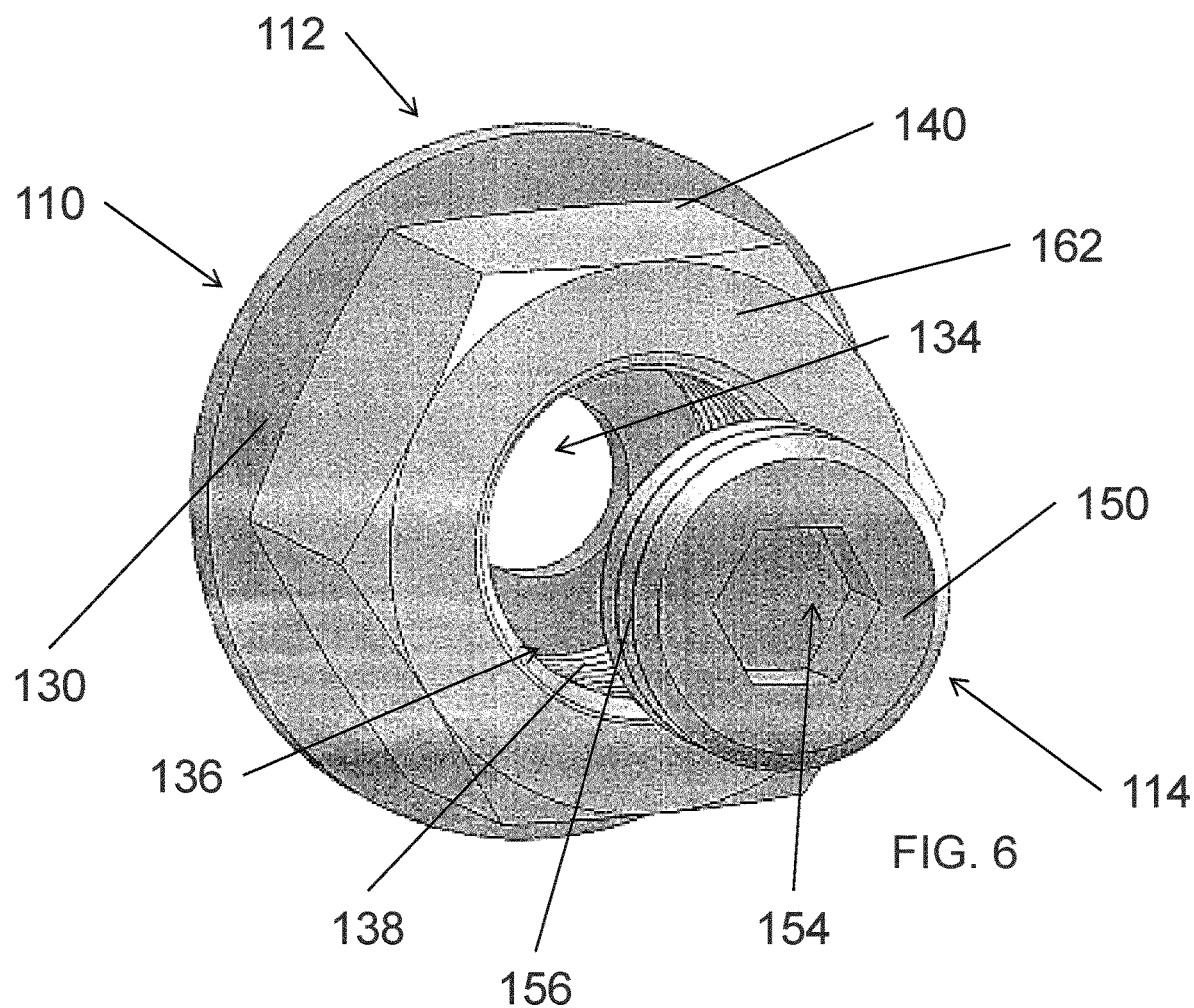
FIG. 6 is an exploded perspective view of a nut/bolt/washer connector.

Reference is now made to FIG. 6 which illustrates an exploded perspective view of a nut/bolt/washer connector 110. The connector 110 comprises a base portion 112 and a cap portion 114. An inner surface of the base portion 112 is threaded. An outer surface of the cap portion 114 is correspondingly threaded. Thus, the cap portion 114 may be attached to the base portion 112 through the threaded interconnection. In this configuration, the base portion 112 comprises a female body member of the assembly and the cap portion 114 comprises a male body member.

Figure 7:
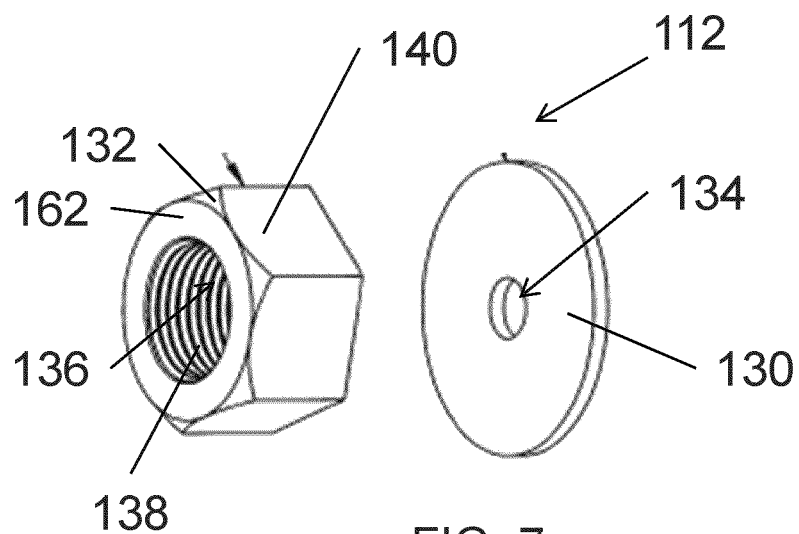
FIG. 7 is an exploded perspective view of a base portion of the connector of FIG. 6.
Figure 8:
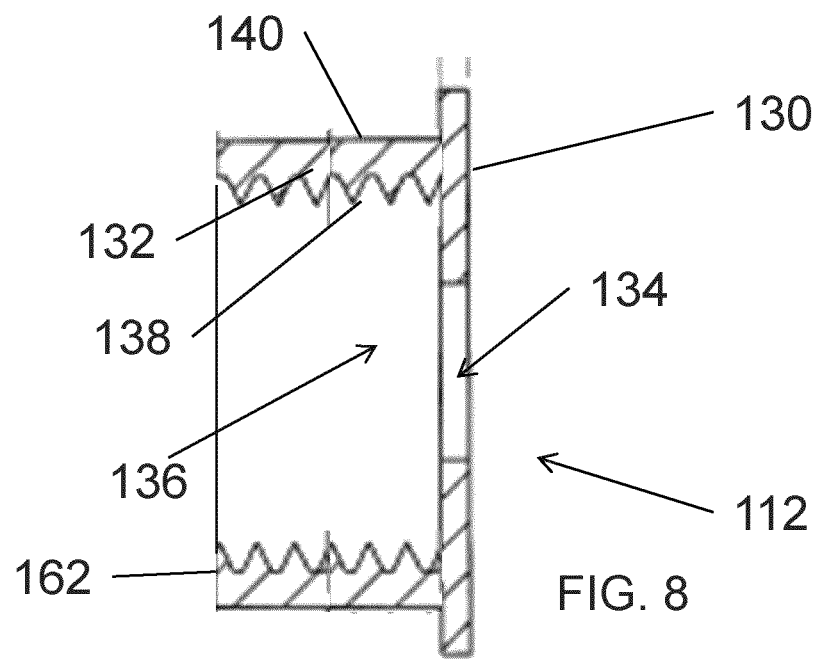
FIG. 8 is a cross-sectional view of the base portion of the connector of FIG. 6.

Reference is now additionally made to FIG. 7 which illustrates an exploded perspective view of the base portion 112 and FIG. 8 which illustrates a cross-sectional view of the (assembled) base portion 112. The base portion 112 comprises a disc-shaped base plate 130. A cylindrical member 132 is mounted to the base plate 130 (this is not shown in the exploded view of FIG. 7, see FIG. 8). The cylindrical member 132 is preferably centered on the base plate 130. The base plate 130 includes an opening 134 extending there through. The cylindrical member 132 includes opening 136 coaxially aligned with the opening 134. The cylindrical member 132 accordingly has an inner sidewall 138 and an outer sidewall 140. The inner sidewall 138 is threaded. The outer sidewall 140 is sized and shaped to imitate a hexagonal nut (or bolt head), with the disc-shaped base plate 130 sized and shaped relative thereto to imitate a washer.

Indeed, the base portion 112 can easily be fabricated from off-the-shelf components. The disc-shaped base plate 130 may be a standard steel hardware washer and the cylindrical member 132 may be a standard steel hex nut. The hex nut may be welded to the washer with a concentric configuration.

Figure 9:
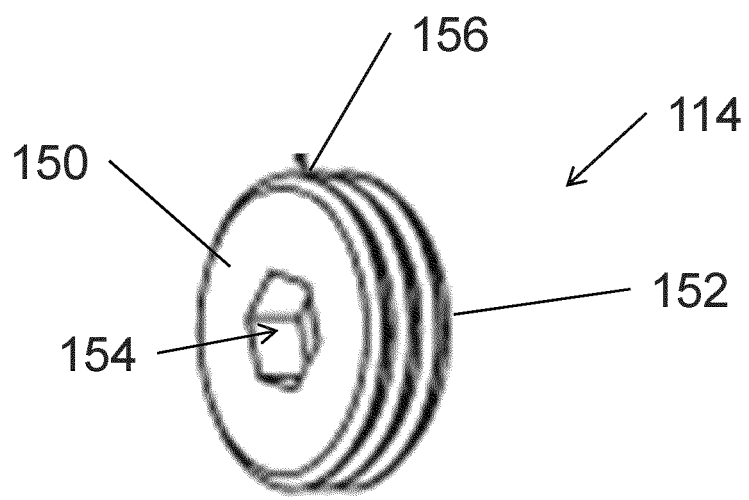
FIG. 9 is a perspective view of a cap portion of the connector of FIG. 6.
Figure 10:
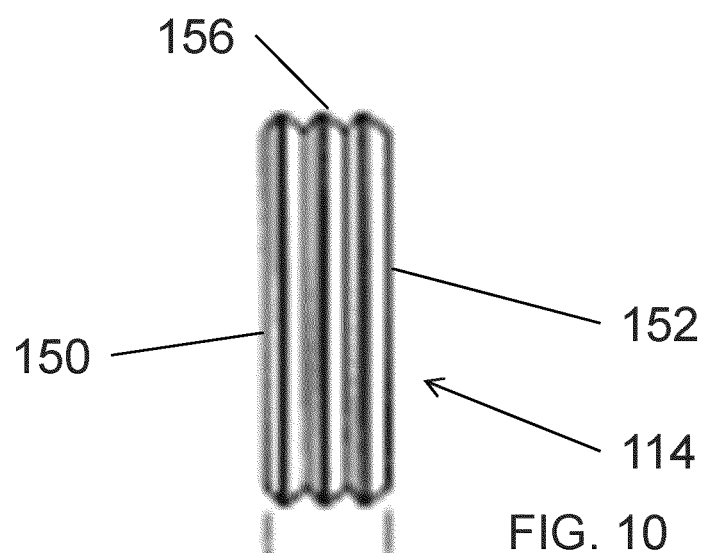
FIG. 10 is a side view of the cap portion of the connector of FIG. 6.

Reference is now additionally made to FIG. 9 which illustrates a perspective view of the cap portion 114 and FIG. 10 which illustrates a side view of the cap portion 114. The cap portion 114 has a flat outer surface 150 and a flat base surface 152. The flat outer surface 150 further includes an opening 154 having a hexagonal shape sized to mate with a standard size Allen wrench or other tool. The opening 154 is optional. The cap portion 114 further includes a cylindrical outer surface 156 extending between the flat outer surface 150 and the flat base surface 152. The cylindrical outer surface 156 is threaded to matingly correspond with the threaded inner sidewall 138 of the base portion 112.

The cap portion 114 may comprise, for example, a steel set screw.

Reference is once again made to FIG. 6. The opening 134 in the base plate 130 of the base portion 112 is sized to permit passage there through of a shaft of a mounting device (such as a screw or bolt) like that shown in FIG. 1. The opening 136 (FIGS. 7 and 8) in the cylindrical member 132 of the base portion 112 is sized to permit reception of a head portion of the mounting device as well as receive the cap portion 114. Advantageously, the user is not limited in selection of the mounting device. No limit on mounting hardware length, size or grade exists. So, if used in an ornamental manner, the user may choose a lower length, size or grade mounting device. However, if used in a structural manner the user may instead select a higher length, size or grade mounting device. The connector 110 is accordingly useful over a wide range of uses from purely ornamental to fully structural (where such structural use is augmented by the ornamental features of the base portion and cap portion).

Figure 11:
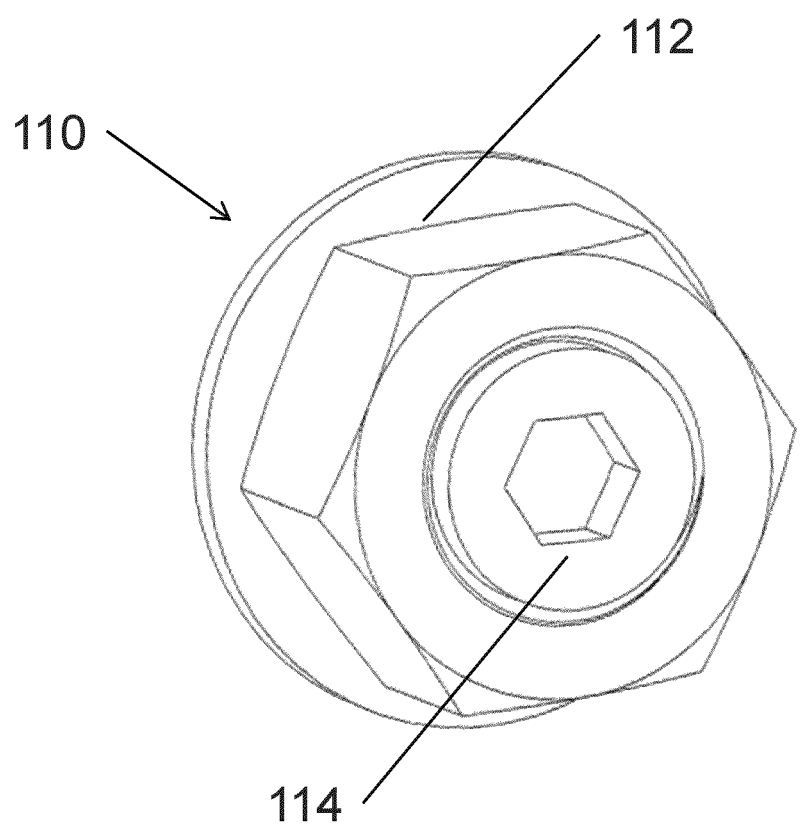
FIG. 11 is an assembled perspective view of the connector of FIG. 6.

To install the connector 110, the base portion 112 is positioned on a mounting member at a desired mounting location. The mounting device (reference 72 of FIG. 1) is driven into the mounting member through the opening 134 in the base plate 130 until the head portion 74 (see, FIG. 1) rests against the base plate 130. The cap portion 114 is then attached to the base portion 112 by engaging the threaded outer sidewall 156 of the cap portion 114 to threaded inner sidewall 138 of the base portion 112. The cap portion 114 is rotated to tighten the cap portion 114 into a secured position on the base portion 112. The opening 154 may be advantageously used during the tightening operation to receive an assembly tool such as an Allen wrench. Preferably, the cap portion 114 is tightened until the flat outer surface 150 substantially flush with a top surface 162 of the base portion 112 (see, FIG. 11). The resulting assembly thus imitates an architectural hardware component of the nut/bolt/washer connector type. Advantageously, the installation solely requires the use of a conventional mounting device (for example, screw or bolt) and thus does not require specific installation expertise or tools. The connector 110 may solely provide a decorative feature as installed. Alternatively, through proper selection of the mounting device 72, the connector 110 may additionally serve as a structural component.

Those skilled in the art recognize that with improvements in construction materials, many installations will no longer require beams or other support members. Nonetheless, the architectural design may require the presence of such beams or members even where they are not structurally required (for example, are not load bearing). It is common in such installations to install faux beams or members, for example, made or foam or other lightweight non-structurally graded materials that are aesthetically treated through painting and other techniques to look like a real beam or member. To complete the illusion that these faux beams or members are real, it is important that the proper supporting hardware be used (such as rivets, pins, nut/bolt/washers, etc.). The connectors 10 and 110 as discussed herein provide an effective means for adding supporting hardware connectors of a proper style and size. An advantage of the connectors 10 and 110 over prior art hardware is that the mounting device 72 is selectable at user option in accordance with the given application. Thus, the mounting device 72 may chosen for a tack application of the connector 10 or 110, or alternatively chosen for a more structural application (such as for retaining the faux beam or member to a wall stud).

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A hardware component imitating a nut/bolt/washer connection for structural members, comprising:
    a base portion including a disc-shaped base plate and a cylindrical member including an outer surface in the shape of a hex nut, the disc-shaped base plate extending both radially outward of an outer periphery of the cylindrical member and radially inward of an inner periphery of the cylindrical member and imitating a washer;
    wherein the disc-shaped base plate includes a first opening having a first diameter and the cylindrical member includes a second opening having a second diameter, said first and second openings being concentric and said second diameter being larger than said first diameter; and
    wherein the first opening is sized to receive therethrough a shaft of a mounting device and the second opening is sized to receive therein a head of said mounting device; and
    a cap portion and wherein said second opening of the cylindrical member is sized and shaped to receive the cap portion such that said cap portion completely closes an end of the second opening.

2. The hardware component of claim 1, wherein said cap portion includes a recess sized and shaped to receive an assembly tool.

3. The hardware component of claim 2, wherein said assembly tool is an Allen wrench.

4. The hardware component of claim 1, wherein the cap portion includes a flat outer surface, a flat base surface and a cylindrical outer surface extending between the flat outer surface and the flat base surface.

5. The hardware component of claim 4, wherein the cylindrical member includes a first threaded surface and the cap portion includes a second threaded surface, said first threaded surface is formed on an inner surface of said cylindrical member and said second threaded surface is formed on the cylindrical outer surface of the cap portion.

6. A hardware component imitating a nut/bolt/washer connection for structural members, comprising:
    a base portion including a disc-shaped base plate and a cylindrical member having a first end proximate the base plate, a second end opposite the first end and an outer surface with a hex configuration, said cylindrical member further including an aperture formed in the second end, the disc-shaped base plate including a flat base surface extending both outwardly beyond an outer periphery of the cylindrical member and inwardly beyond an inner periphery of the cylindrical member, the flat base surface facing toward the second end of the cylindrical member, an opening formed in the disc-shaped base plate inwardly of the inner periphery of the cylindrical member; and a mounting device including a shaft extending through the opening in the disc-shaped base plate and an enlarged head positioned within the aperture of the cylindrical member;

a cap portion including a flat outer surface, a flat base surface and an outer surface extending between the flat outer surface and the flat base surface;

wherein the cap portion is configured to be received within the aperture to cover and conceal the enlarged head portion of the mounting device;

wherein said flat outer surface further includes a recess sized and shaped to receive an assembly tool in the form of an Allen wrench.

7. The hardware component of claim 6, wherein the aperture includes an inner threaded surface and the cap portion includes an outer threaded surface configured to mate with the inner threaded surface.

8. The hardware component of claim 6, wherein the opening is concentric with the aperture.

\* \* \* \* \*